(12) United States Patent
Donlagic et al.

(10) Patent No.: US 8,942,531 B2
(45) Date of Patent: Jan. 27, 2015

(54) OPTICAL FUSE DEVICES, OPTICAL FIBER LINES, AND METHODS OF MANUFACTURING SAME

(71) Applicant: University of Maribor, Maribor (SI)

(72) Inventors: Denis Donlagic, Maribor (SI); Simon Pevec, Podcetrtek (SI)

(73) Assignee: University of Maribor, Maribor (SI)

( * ) Notice: Subject to any disclaimer, the term of this patent is extended or adjusted under 35 U.S.C. 154(b) by 0 days.

(21) Appl. No.: 14/022,138

(22) Filed: Sep. 9, 2013

(65) Prior Publication Data

US 2014/0010506 A1     Jan. 9, 2014

Related U.S. Application Data

(63) Continuation of application No. PCT/EP2012/054150, filed on Mar. 9, 2012.

(60) Provisional application No. 61/452,060, filed on Mar. 11, 2011.

(51) Int. Cl.
| | |
|---|---|
| *G02B 6/02* | (2006.01) |
| *G02B 6/44* | (2006.01) |
| *G02B 6/26* | (2006.01) |
| *G02B 6/255* | (2006.01) |

(52) U.S. Cl.
CPC ... *G02B 6/44* (2013.01); *G02B 6/264* (2013.01); *G02B 6/2551* (2013.01); *G02B 6/02* (2013.01)
USPC .......................................................... 385/123

(58) Field of Classification Search
CPC ........................................................ G02B 6/264
USPC ....................................... 385/16, 96, 140, 123
See application file for complete search history.

(56) References Cited

U.S. PATENT DOCUMENTS

| | | | |
|---|---|---|---|
| 6,218,658 B1 * | 4/2001 | Taneda et al. ................. | 250/216 |
| 6,317,548 B1 * | 11/2001 | Rockwell et al. ............. | 385/123 |
| 6,415,075 B1 * | 7/2002 | DeRosa et al. ................. | 385/27 |
| 7,333,702 B2 * | 2/2008 | Fujita et al. .................... | 385/124 |
| 7,403,684 B2 * | 7/2008 | Todoroki ........................ | 385/50 |
| 8,233,758 B2 * | 7/2012 | Donval et al. .................. | 385/16 |
| 8,478,087 B2 * | 7/2013 | Farber et al. ................... | 385/16 |

(Continued)

FOREIGN PATENT DOCUMENTS

| | | |
|---|---|---|
| EP | 0 943 954 A2 | 9/1999 |
| EP | 1 686 411 A1 | 8/2006 |

(Continued)

OTHER PUBLICATIONS

International Search Report and Written Opinion of International Application No. PCT/EP2012/054150 dated May 31, 2012.

(Continued)

*Primary Examiner* — Charlie Peng
(74) *Attorney, Agent, or Firm* — Dugan & Dugan, PC

(57) ABSTRACT

An optical fuse device adapted to be placed in between ends of lead-in fibers of an optical fiber line. The optical fuse device has a destructible region having a core, the destructible region including a light absorbing material adapted to heat and destroy the core upon application of a light intensity greater than a predetermined threshold. Optical fiber lines including the optical fuse device and methods of manufacturing the optical fuse device are provided. Numerous other aspects are provided.

10 Claims, 11 Drawing Sheets

(56) References Cited

U.S. PATENT DOCUMENTS

| | | | |
|---|---|---|---|
| 8,526,775 B2 * | 9/2013 | Takenaga | 385/139 |
| 2010/0061680 A1 * | 3/2010 | Oron et al. | 385/16 |

FOREIGN PATENT DOCUMENTS

| | | |
|---|---|---|
| JP | 2006-276461 | 10/2006 |
| JP | 2007-219236 | 8/2007 |
| JP | 2009-122462 | 6/2009 |
| JP | 2011-002543 | 1/2011 |

OTHER PUBLICATIONS

Todoroki et al. "Optical fuse by carbon-coated TeO2 glass segment inserted in silica glass optical fiber circuit", Jpn. J. Appl. Phys., Express Letter, pp. 1-5.

Vishnubhatla et al., "Shape control of microchannels fabricated in fused silica by femtosecond laser irradiation and chemical etching," Opt. Express, vol. 17, 8685-8695 (2009).

* cited by examiner

OPTICAL FUSE DEVICES, OPTICAL FIBER LINES, AND METHODS OF MANUFACTURING SAME

RELATED APPLICATIONS

This application is a continuation of and claims priority to PCT International Application No. PCT/EP2012/054150 "OPTICAL FUSE DEVICES, OPTICAL FIBER LINES AND METHODS OF MANUFACTURING SAME" filed on Mar. 9, 2012, which claims priority to U.S. Provisional Application Ser. No. 61/452,060 entitled "OPTICAL FUSE DEVICES, OPTICAL FIBER LINES, AND METHODS OF MANUFACTURING SAME" filed on Mar. 11, 2011, the disclosures of each of which are hereby incorporated by reference in their entirety herein.

FIELD

The present invention relates to optical fuses, and more particularly to optical fiber lines including optical fuses.

BACKGROUND

Optical power has been steadily increased in telecommunication and other modern fiber optic systems. Unexpected events, such as failures of critical components and other malfunctions within such fiber optic systems may cause increases in optical power intensity well above critical thresholds. Such optical power intensity overload conditions may trigger various events, such as damage or destruction of attached optical equipment, possibility of fire hazard, etc. Effective and fast protection against any unexpected increase of optical power in optical fiber systems is desirable.

Some prior art solutions use relatively large fuse assemblies that have diameters larger than the incoming and outgoing optical fibers they attach to. This may present limitations in some systems. Further, many of the prior art designs may have a relatively slow response time due to their large inherent size. Also, some systems may suffer from high insertion loss. Moreover, such optical fuse devices may be relatively complex to produce.

Thus, given the above, there is a long felt and unmet need for a small diameter, fast and effective optical fuse device to offer protection against unexpected increases of optical power in optical fiber systems.

SUMMARY

In one aspect, an optical fuse device is provided. The optical fuse device includes a destructible region having a core, the destructible region including a light absorbing material adapted to heat the core, the destructible region adapted to be destroyed upon application of a light intensity greater than a predetermined threshold.

In another aspect, a light intensity protected optical fiber line is provided. The light intensity protected optical fiber line includes a first lead-in fiber having a core and cladding, a second lead-in fiber having a core and cladding, and an optical fuse device including a core extending continuously between and connecting the cores of the first lead-in fiber and second lead-in fiber, the optical fuse device having a destructible region including a light absorbing material adapted to cause the destructible region to be destroyed upon application of a light intensity greater than a predetermined threshold thereby protecting the optical fiber line.

In another aspect, a method of manufacturing an optical fuse device is provided. The method includes providing a structure-forming fiber having a core-forming portion, bonding the structure-forming fiber between a first lead-in fiber and a second lead-in fiber to form a fiber assembly, and etching at least the structure-forming fiber of the fiber assembly to remove a radial portion to form an optical fuse device having a core extending between the first lead-in fiber and the second lead-in fiber.

In another aspect, a method of manufacturing an optical fuse device is provided. The method includes providing a structure-forming fiber having a core-forming portion, a preferentially-etchable portion, and an outer cladding-forming portion; bonding the structure-forming fiber to first lead-in fiber to form a fiber assembly; etching at least the structure-forming fiber of the fiber assembly to remove at least a portion of the preferentially-etchable portion to form an optical fuse precursor having a destructible core, and an outer cladding surrounding the core; and bonding the optical fuse precursor to a second lead-in fiber to form a light intensity protected optical fiber line including the optical fuse device.

Numerous other aspects are provided in accordance with these and other aspects of the invention. Other features and aspects of the present invention will become more fully apparent from the following detailed description, the appended claims, and the accompanying drawings.

DETAILED DESCRIPTION

Figure 1A:
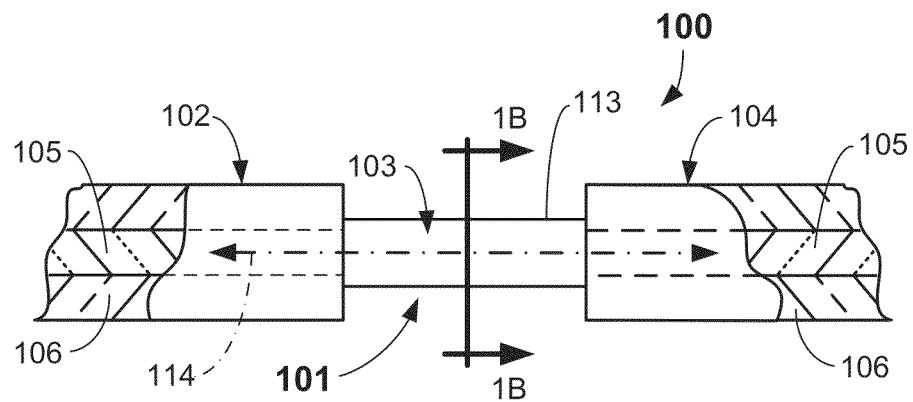
FIG. 1A illustrates a partially cross-sectioned side view of an embodiment of optical fiber line including an optical fuse device according to embodiments.

The present invention discloses an optical fuse device adapted to be placed in an optical fiber line to allow protection of one or more components in an optical system from light over power situations where a light intensity in the optical system is above a predetermined threshold value. The present invention optical fuse device may find utility in optical telecommunication systems, fiber laser systems, sensor systems, testing systems, and other light transmission applications where high intensity light signals or pulses may be present.

According to a first aspect, an optical fuse device of the present invention includes a very thin, thread-like destructible region, which may be a meltable region in some embodiments. The destructible region may include a core. In some embodiments, the destructible region may include a core and an inner cladding surrounding the core thereby forming a light guiding (waveguide) structure. The destructible region includes a light absorbing material that is adapted to heat and destroy (e.g., melt) the core, or the core and cladding (if present) upon application of a light intensity greater than a predetermined threshold. Upon destruction, optical signals may no longer be carried through the optical fuse device. Thus, the optical fuse device may protect system components optically coupled to the optical fuse device from high intensity conditions that may harm system components.

In another aspect of the present invention, a light intensity protected optical fiber line is provided. The optical fiber line includes two lead-in fibers having the optical fuse device optically coupled there between.

In another aspect of the present invention, a method of manufacturing an optical fuse device is disclosed. The method includes bonding (e.g., splicing) a structure-forming fiber having a preferentially-etchable portion between two lead-in fibers and etching the structure-forming fiber to remove at least a portion of the preferentially-etchable portion and form an optical fuse device extending between the two lead-in fibers. In other embodiments, the structure forming fiber is bonded to a first lead-in fiber, axially etched to form an optical fuse precursor, and then the assembly is bonded to the second lead-in fiber.

These and other embodiments of the present invention are further described with reference to FIGS. 1A-18 below.

A first embodiment of a light intensity protected optical fiber line 100 including an optical fuse device 101 according to an aspect of the invention is described with reference to FIGS. 1A-1B. The light intensity protected optical fiber line 100 as described herein may be alternatively referred to as the "optical fiber line," or the "fiber line." The optical fiber line 100 includes first and second lead-in optical fibers 102, 104 with the optical fuse device 101 optically coupled between the respective ends of the first and second lead-in optical fibers 102, 104. The optical fuse device 101 extends continuously between the ends of the lead-in fibers 102, 104 in the un-melted condition. Thus, the optical fuse device 101 is axially unbroken. In the depicted embodiment, the lead-in optical fibers 102, 104 may include a light guiding optical structure that is, in normal operation, adapted to lead light to and from optical system components that are optically connected to the lead-in optical fibers 102, 104, and effectively transmit those signals through the optical fuse device 101 with relatively low loss. Losses of less than about 0.5 dB at 1550 nm may be achieved.

The light guiding optical structure of the lead-in fibers 102, 104 may include a conventional fiber structure including at least a core 105, and preferably a core 105 and an inner cladding 106, for example. Any suitable light guiding structure may be used, such as step index or graded index. Lead-in optical fibers 102, 104 may be, for example, single mode optical fibers, multimode optical fibers, polarization maintaining optical fibers, polarization preserving optical fibers, photonic crystal fibers, or any other practical optical fiber having the ability to carry light signals. Other fiber types and structures may be used. In some embodiments, the lead-in fibers 102, 104 may be standard single-mode or multimode telecommunication fibers. Optical fiber lines including combinations of the afore-mentioned optical fibers may also benefit from the present invention. In some embodiments, the lead-in optical fibers 102, 104 may be made up of and include two or more segments or fiber types that are bonded (e.g., spliced) or otherwise interconnected together. The lead-in optical fibers 102, 104 may have any arbitrary length.

In more detail, the optical fuse device 101 includes a destructible region 103 that may be constituted of a meltable material and located between the ends of the lead-in optical fibers 102, 104. A meltable material of the destructible region 103 may be a silica-based material. Furthermore, to promote rapid melting, the optical fuse device 101 may have a relatively small cross-sectional dimension. For example, a cross-sectional area of the optical fuse device 101 may be less than about 500 $\mu m^2$, less than about 300 $\mu m^2$, less than about 150 $\mu m^2$, less than about 100 $\mu m^2$, or even less than 70 $\mu m^2$ in some embodiments. Other cross-sectional areas may be used. In other embodiments, the cross-sectional area of the optical fuse device 101 may be between about 60 $\mu m^2$ and about 600 $\mu m^2$, or even between about 80 $\mu m^2$ and about 180 $\mu m^2$, for example. The optical fuse device 101 includes a central axis 114 passing through the centerline of the optical fuse device 101. The central axis 114 of the optical fuse device 101 is preferably substantially coincident with the respective central axes of the lead-in fibers 102, 104. Accordingly, the cores 105 of the lead-in fibers 102, 104 and the core of the optical fuse device 101 may be substantially aligned, i.e., the optical fuse device 101 and the lead in fibers may be generally coaxial.

In some embodiments, the optical fuse device 101 may be a thin, fiber-like cylindrical structure that extends continuously, in an unbroken fashion, between the cores 105 of the lead-in fibers 102, 104. For example, the optical fuse device 101 may have a cylindrical core 111 as shown in FIG. 1B. Optionally, a relatively thin annular inner cladding 113 may surround the core 111. The core 111 may have substantially a same refractive index as the core 105 of one or both of the lead-in fibers 102, 104 to minimize optical coupling losses between the optical fuse device 101 and the lead-in fibers 102, 104. The inner cladding 113 may be manufactured from any material adapted to form a waveguide structure with the core 111 (e.g., substantially pure silica). The inner cladding 113 may have a thickness of less than 50% of a diameter of the core 111. Other thicknesses may be used.

In some embodiments, the optical fuse device 101 may have a core 111 having a same or substantially similar size (e.g., outer diameter) as one or more of the cores 105 of the lead-in fibers 102, 104. In the depicted embodiment, an outer dimension of the optical fuse device 101 may be substantially constant between the lead in fibers 102, 104. To achieve melting of the destructible region 103 of the optical fuse device 101, and absorbing material may be included. For example, in some embodiments, the core 111 may be doped with an absorbing material. As such, a doping level of the absorbing material and length of the optical fuse device 101, amongst other parameters, may be selected to achieve a desired optical absorption and heat generation within optical fuse device 101 such that the destructible region 103 melts at a desired intensity threshold and does so relatively rapidly. The actual optical power that will cause melting of the optical fuse device 101 may thus depend on the diameter, length, and composition of the optical fuse device 101, as well as presence of and pressure of a gas surrounding the optical fuse device 101, as will be described later herein.

In some embodiments, the optical fuse device 101 includes the destructible region 103 that fuses (melts) and thereby limits light intensities passing between the optical fibers 102, 104 to predetermined intensity values. For example, the fuse melting values (intensity values at which the meltable region 103 will melt) may limit the absolute intensity to no greater than about 500 mW. In other embodiments, the optical fuse device 101 includes the destructible region 103 that fuses (melts) at less than about 400 mW. In one or more embodiments, the destructible region 103 may fuse (melt) at between about 100 mW and about 400 mW. Other fuse values may be used.

Generated temperatures of between about 1500° C. and about 2500° C. in the core 111 may cause the destructible region 103 of the optical fuse device 101 to melt. The designed fuse melting value for the destructible region 103 thus may be adjusted by changing the level of absorbent doping in the core 111, the length, and/or the diameter of the destructible region 103, for example.

In some embodiments, a diameter of the core 111 may be between about 5 μm and about 20 μm, for example. Radial thickness of the inner cladding 113 may be between about 0 μm and about 10 μm, for example. The radial thickness of the cladding 113 can be of sufficient thickness to prevent interaction of the optical field guided within the core 111 with any surrounding material or to prevent modal field distortion due to a large refractive index difference between the inner cladding 113 and a space surrounding the inner cladding 113. However, in some embodiments, the cladding may be omitted. An axial length of the optical fuse device 101 between respective ends of the lead-in fibers 102, 104 may be between about 50 μm and about 3 cm long, or even between about 50 μm and about 400 μm, for example. Other axial lengths may be used. Other dimensions of the core 111 and inner cladding 113 may be used depending upon the fuse melting value required.

The core 111 of the optical fuse device 101 in some embodiments may be manufactured from a suitable optically transmissive material, such as silica doped with at least a material that causes relatively high optical absorption. For example, the core 111 may be silica doped with an effective amount of a suitable metal. Metals such as Fe, V, Cr, Co, Ni may be included in the core 111 as an absorbing material. In particular, the absorbent material may be added to silica in the core 111 in an effective concentration to increase the optical loss to above 0.5 dB/cm, above 1.0 dB/cm, above 5 dB/cm, or even above 10 dB/cm at an operational wavelength of the light signal traveling in the optical fuse device 101. Other concentrations may be used. Other than the addition of the absorbing material, the composition of the core 111 may, in some embodiments, include a similar composition as the core 105 of one or more of the lead-in fibers 102, 105. For example, in some embodiments, the core 111 may comprise germania-doped silica that is co-doped with an effective amount of an absorbing material. For example, the core 111 may include between about 2 mol % and about 30 mol % of germania in silica. One or more embodiments may include between about 3 mol % and about 20 mol % germania in silica, or even between about 4 mol % and about 15 mol % germania in silica. These cores 111 may be co-doped with an effective concentration of an absorbing material (e.g., vanadium), as discussed above. For example, between about 0.01% to 2% mol % of an absorbing material, or even between about 0.4% and 1.2% mol % absorbing material, may be used. Other amounts may be used.

In operation, when a sufficiently high optical power (intensity) propagates through optical fuse device 101, this will cause heating of the core 111 and inner cladding 113 (if present) of the optical fuse device 101 and cause them to melt. Since the outer diameter of the optical fuse device 101 is relatively small, in some embodiments, generally a few microns thicker than core 105 of lead-in fibers 102, 104, a relatively low power may be needed to reach a softening or melting point of core 111 and inner cladding 113 materials. Generating enough heat within the core 111 and inner cladding 113 may cause permanent destruction (melting) of the optical fuse device 101 such that optical signals are no longer be carried through the optical fuse device 101. FIG. 3C illustrates a micrograph view of the embodiment of optical fuse device included in an optical fiber line according to embodiments of the invention.

In some embodiments, as will be described further herein, an activation power to cause the optical fuse device 101 to fuse (burn) may be further reduced by providing a suitable vacuum (e.g., a vacuum of about 10 Torr or lower (i.e., higher negative pressure levels greater than about 10 Torr) to a space surrounding the optical fuse device 101. Optionally, pressures lower than ambient pressure may be provided to the space surrounding the optical fuse device 101 to reduce heat transfer (e.g., convective heat transfer) from a heated region of the optical fuse device 101. In some embodiments, vacuum levels between about 1 and 50 Torr may be provided in the space. Other values of vacuum or low pressure may be provided. In some embodiments, gases other than air or a vacuum may be provided in the space surrounding the optical fuse device 101. Gases such as inert gasses or other relatively low thermal conductivity gases may be provided in the space (e.g., Xenon gas).

Figure 1B:
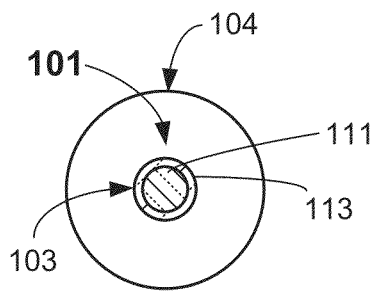
FIG. 1B illustrates a cross-sectioned end view of the optical fuse device of FIG. 1A taken along section lines 1B-1B of FIG. 1A.
Figure 1C:
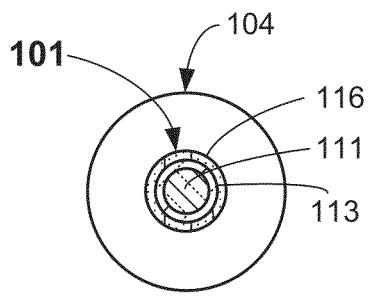
FIG. 1C illustrates a cross-sectioned end view of an alternative optical fuse device.

In other embodiments, as shown in FIG. 1C, a further layer 116 of a pyrotechnical or explosive material may be applied in an effective amount to the surface of the inner cladding 113 to facilitate fuse destruction or burnout at even lower optical power levels. Pyrotechnical or primary explosive materials such as Sodium azide, Diazodinitrophenol (DDNP), or gun powder may be used. Other pyrotechnical or explosive materials may be used.

Figure 2A:
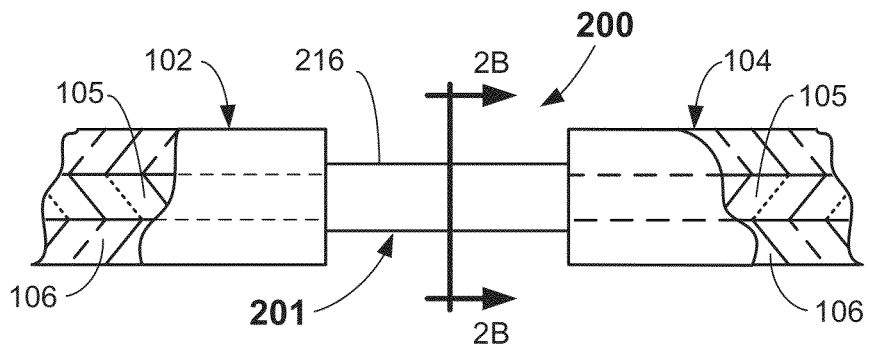
FIG. 2A illustrates a partially cross-sectioned side view of another embodiment of an optical fuse device according to another embodiment.
Figure 2B:
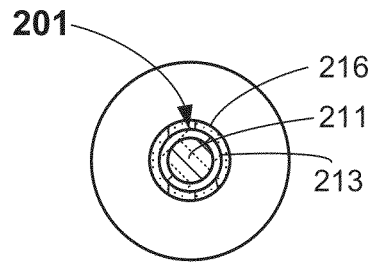
FIG. 2B illustrates a cross-sectioned view of the optical fuse device of FIG. 2A taken along section lines 2B-2B.

In another aspect shown in FIG. 2A-2B, a optical line 200 may include an optical fuse device 201 similar to the previous embodiment, except that the absorbing material is not provided in the core 211, but is provided as a coating 216 covering at least a portion of the outside surface of the inner cladding 213. The core 211, in this embodiment, may include an index structure adapted to carry light signals. For example, the core 211 may comprise a germania-doped silica. The germania may be provided in an amount between about 3 mol % and about 25 mol % of germania in silica. The coating 216 may include an absorbing material. The absorbing material coating 216 may be, for example, carbon or a metal coating such as platinum. Other suitable absorbing materials may be used. The coating thickness may between about 0.003 µm and about 5 µm, or even between about 0.01 µm and about 1 µm, for example. In this embodiment, the inner cladding 213 may be sufficiently thin (e.g., about 1 µm or less) so as to allow interaction of the optical field propagating in the optical fiber line 200 with the coating 216 of absorbing material through the evanescent field. The coating 216 may also include a layer of a material having pyrotechnical characteristics such as described above to facilitate burn-out of the optical fuse member 201 at even lower optical power densities.

In an alternative embodiment, the core 111 may include the light absorbing material in the core 111 as described above, and in addition, an absorbing material coating 216 may be applied to an outer surface of the inner cladding 113.

Figure 3A:
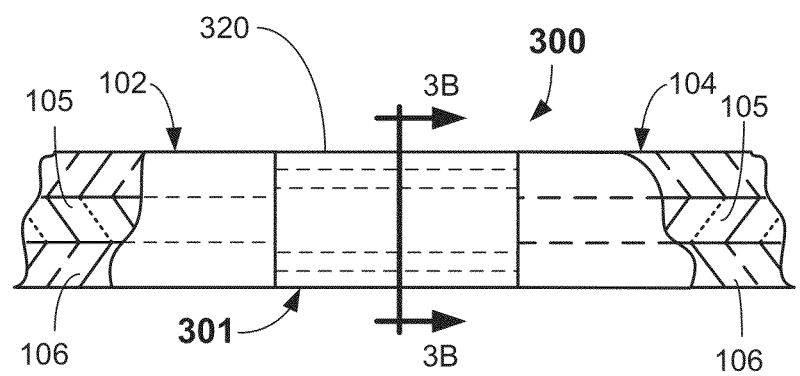
FIG. 3A illustrates a partially cross-sectioned side view of another embodiment of an optical fiber line including an optical fuse device according to embodiments.
Figure 3B:
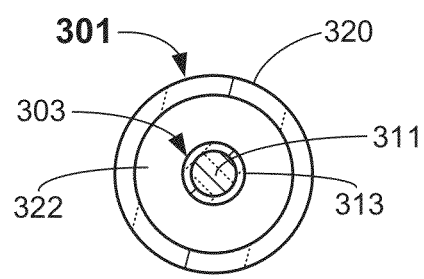
FIG. 3B illustrates a cross-sectioned end view of the embodiment of optical fuse device of FIG. 3A taken along section line 3B-3B.
Figure 3C:
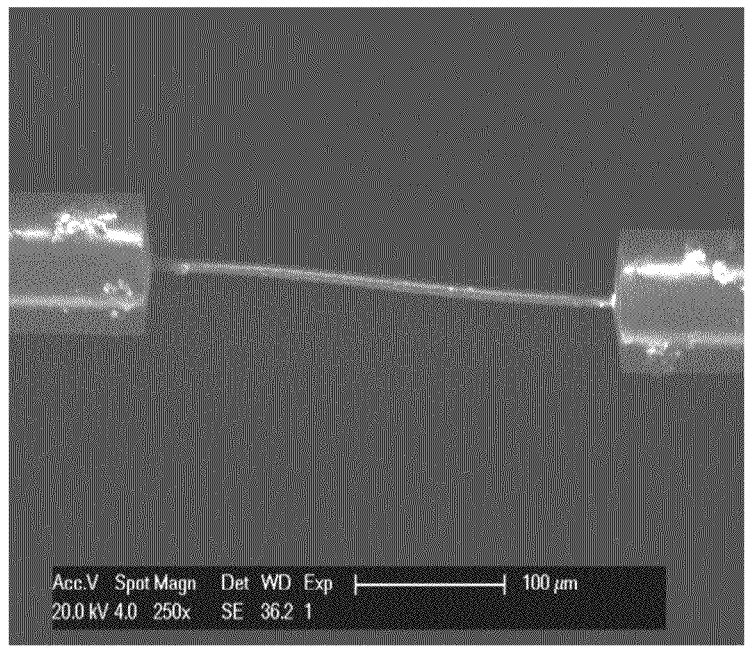
FIG. 3C illustrates an enlarged micrograph view of an embodiment of optical fuse device according to embodiments.

Another embodiment of an optical fuse device 301 of present invention is shown in FIG. 3A-3B. The optical fuse device 301 is shown included within an optical fiber line 300 and optically coupled between lead-in fibers 102, 104. The optical fuse device 301 includes a core 311 and inner cladding 313 that may be of the same construction as any of the previously-described embodiments. However, in this embodiment, the optical fuse device 301 includes an outer cladding 320 (e.g., having an annulus shape), as shown on FIG. 3B. The outer cladding 320 encloses the destructible region 303 and may also bonded to the cladding 106 of both lead-in fibers 102, 104. A non-solid void 322 in the shape of an annulus may be provided between the inner cladding 313 and outer cladding 320. A thickness of the outer cladding may be greater than about 10 µm, and may be between about 10 µm and about 50 µm, in some embodiments. Other thickness dimensions may be used.

The purpose of the outer cladding 320 is to provide mechanical support to the destructible region 303 (e.g., to limit localized bending) of the optical fuse device 301 thereby allowing relatively easy handling and packaging of the optical fuse device 301. Furthermore, the outer cladding 320 may allow the destructible region 303 to be hermetically enclosed. Hermetical enclosure of destructible region 303 may be beneficial when the space, i.e., the non-solid void 322 enclosed by the outer cladding 320 is partially or completely evacuated to a relatively low pressure or vacuum level, as described above, to achieve a relatively lower heat (e.g., convective) transfer from the destructible region 303. Other relatively low thermal conductivity gases may be used, such as Xenon. Reduced heat transfer from the destructible region 303 may reduce the amount of optical power to achieve fuse melting and additionally or optionally may shorten the fuse reaction time.

One main advantage of the optical fuse devices 101-301 described herein over other known solutions is that the overall outside dimension and mass of the destructible region heated by optical field is relatively small. For example, a destructible section 103-303 that is suitable for use in optical fiber lines of standard single mode communication systems may have an outer diameter that is as small as about 5 µm to about 25 µm, or even about 7 µm to about 12 µm, for example. Other sizes may be used. This small size may lead to a relatively fast response of the optical fuse device at relatively low optical power, while providing low optical insertion losses of the optical fuse device in an unburned state within the optical fiber line.

Figure 4:
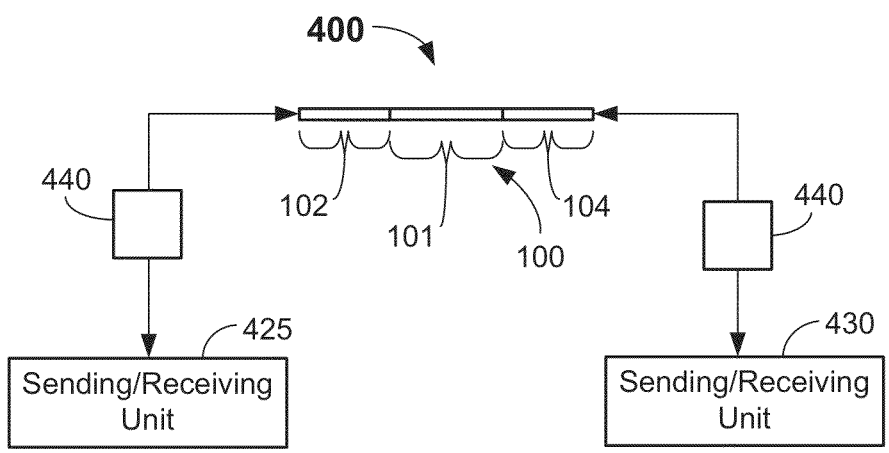
FIG. 4 illustrates a block diagram of an optical system including an optical fiber line and an optical fuse device according to embodiments.
Figure 5:
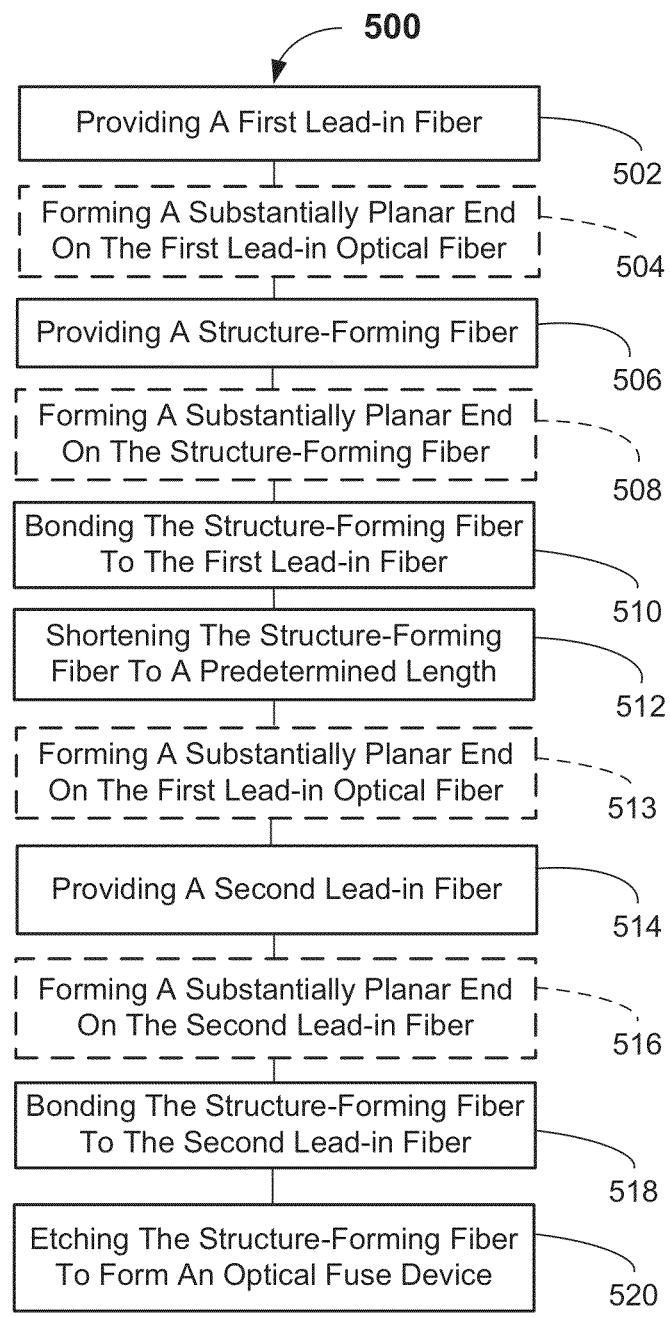
FIG. 5 illustrates a flowchart of a method according to embodiments.

FIG. 4 illustrates a typical optical system 400 including an optical fiber line 100 and the optical fuse device (e.g., 101) of the invention. The optical system 400 may include a first sending/receiving unit 425 and a second sending/receiving unit 430. The sending/receiving units 425, 430 may be part of a wavelength division multiplexing (WDM) system or dense wavelength division multiplexing (DWDM) system adapted to communicate optical signals (light pulses) at 1310 nm and/or 1550 nm operating windows and transmit signals between respective locations, for example. Optionally, light transmission may be in the C, L, E, and S bands, for example. Other operating wavelengths may be used. As described above, the lead-in optical fibers 102, 104 may be any suitable optical fiber type and may be constituted of multiple spliced or connected segments. The optical system 400 in addition to the lasers and detectors of sending/receiving units 425, 430 may also include other optical components 440, such as amplifiers, filters, splitters, multiplexers, etc. The optical fuse devices 100 of the present invention may be provided in optical system 400 at any suitable location. However, typically, the optical fuse devices 100 may be installed in relatively close proximity to a high optical intensity source (e.g., a laser, laser diode, amplifier, etc.)

Figure 6A:
FIGS. 6A-6E illustrates various steps in a method of manufacturing an optical fuse device according to embodiments.
Figure 6B:
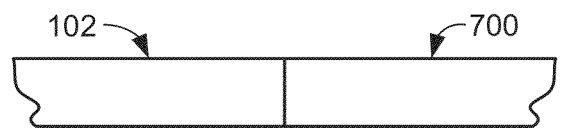

In accordance with another aspect of the invention, a method for manufacturing an optical fuse device (e.g., 101) in an optical fiber line (e.g., 100) is provided. With reference to FIGS. 5 and 6A-6E, the method 500 includes various steps and not necessarily in the order listed order. The method 500 includes in step 502, providing a first lead-in fiber (e.g., 102). Preferably, a substantially planar end is formed on the first lead-in fiber 102 in 504 as shown in FIG. 6A. The method 500 further includes providing a structure-forming fiber (e.g., 700) in 506. Again, a substantially planar end may optionally be formed on the structure-forming fiber in 508 as shown in FIG. 6A. The substantially planar ends may be substantially perpendicular to a longitudinal axis of the fibers 102, 700.

Figure 7:
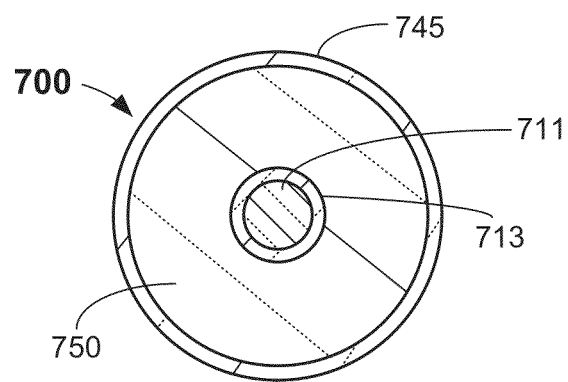
FIG. 7 illustrates an enlarged cross-sectioned end view of a structure-forming fiber that may be used to form an optical fuse device according to embodiments.

The structure-forming fiber 700 as shown in FIG. 7 may have an optical glass structure. For example, in some embodiments, the structure-forming fiber 700 may be a glass fiber having an outer diameter substantially equal to an outer diameter of the lead-in fibers 102, 104. Outer diameters of the fibers 102, 104, 700 of between about 75 µm and 130 µm may be used. Other fiber dimensions may be used as well. The structure-forming fiber 700 may include a selectively-etchable profile (e.g., a dopant profile) that may allow the structure-forming fiber 700 to be selectively reshaped by exposure to an etchant medium, as will be explained further below. In particular, the structure of the optical fuse device (e.g., 101) described herein may be formed by the present method 500.

In more detail, the thin structure of the destructible region 103 of the optical fuse device 101 may be achieved by inclusion of a preferentially-etchable portion 750 within the structure-forming fiber 700 as shown in FIG. 7. The preferentially-etchable region 750 is adapted to etch at higher etching rate than a material of the core-forming portion 711 and inner cladding-forming portion 713. The difference in etching rate between the preferentially-etchable portion 750 and the material of the inner cladding-forming portion 713 of the structure-forming fiber 700 may be 3 times or greater, 5 times or greater, 10 times or greater, 20 times or greater, or even 50 times or greater. Thus, upon exposure to an etching medium as described below, the preferentially-etchable portion 750 may be rapidly removed.

Accordingly, methods of the invention may include, in some embodiments, providing a dopant composition for the preferentially-etchable portion 750 that significantly increases an etching rate of that preferentially-etchable portion 750 as compared to the other regions or portions of the structure-forming fiber 700. In the depicted embodiment, an etching rate may be increased by introduction of dopants into at least a portion, and preferably all, of the preferentially-etchable portion 750 of the structure-forming fiber 700. This effectively increases the etching rate of the material in the preferentially-etchable portion 750 as compared to the other regions (e.g., inner cladding-forming portion 713 as well as the cladding 106 of one or both of the lead-in fibers 102, 104).

In another aspect, void elements, such as voids, holes, porosity, bubbles, macro-capillaries, micro-capillaries, and/or nano-capillaries may be provided in at least a portion of the preferentially-etchable portion 750 of structure-forming fiber 700. In yet another aspect, micro-cracks may be provided in at least a portion of the preferentially-etchable portion 750 of the structure-forming fiber 700 or other areas where rapid removal by etching is desired. Combinations of the aforementioned may also be provided. Inclusion of such void elements and microcracks in the preferentially-etchable portion 750 may increase the etching rate of that portion as will be described more fully below.

In some embodiments of the invention, to significantly increase an etching rate at relatively low dopant concentrations and thereby provide lower stress build up, a phosphorus pentoxide ($P_2O_5$) dopant may be provided in the preferentially-etchable portion 750. $P_2O_5$-doped silica may exhibit a significantly increased etching rate in an etching medium at relatively lower molar concentrations as compared to undoped silica portions. $P_2O_5$-doped silica may, for example, etch at a faster etching rate. $P_2O_5$-doped silica may etch at 5 times or more faster, 10 times or more faster, 20 times or more faster, or even up to 50 times or more faster than etching of substantially-pure silica. The $P_2O_5$-doped silica may be provided at doping levels that are still convenient for practical optical fiber manufacturing.

Thus, in accordance with an aspect of the invention, a very useful increase in etching rate may be achieved when approximately 4.5% mol or more of $P_2O_5$ is present in silica of the preferentially-etchable portion 750 of the structure-forming fiber 700. However, other percentages may be used. Other suitable dopants may be used to achieve enhanced etching rate of the preferentially-etchable portions, such as $GeO_2$, $B_2O_3$, or the like. However, the increase in the etching rate of the doped silica in these cases may introduce problems of internal stress build-up, and may achieve etching rates that are considerably less favorable than in case of phosphorus pentoxide doping.

In the depicted embodiment, the inner cladding-forming portion 713 may be manufactured from a material having a relatively lower etching rate in the etching medium as compared to the preferentially-etchable portion 750. For example, the inner cladding-forming portion 713 may be substantially-undoped silica. By the term substantially undoped or substantially-pure silica as used herein, it is meant that less than about 2 mol % of a dopant may be provided therein. Because of the large differential etching rates between the inner cladding-forming portion 713 and the preferentially-etchable portion 750, the cladding-forming portion 713 may function as an etching barrier, which substantially reduces the etching rate, effectively nearly stopping the etching at an outermost boundary of the cladding-forming portion 713. Accordingly, excellent dimensional control of the outer diameter of the destructible region (e.g., 103) of the optical fuse device 101 may be achieved without having to tightly control the etching process.

In some embodiments, the inner cladding-forming portion 713 may include a layer thickness of between about 1 μm and about 10 μm, for example. Other dimensions may be used. The core forming portion 711 may be doped with any dopant that increases the refractive index of the silica, such as germania. Germania doping of the core 711 at between about 2 mol % and 30 mol % in silica may be provided, for example. In some embodiments, the parameters of the core-forming portion 711 may substantially matched to the parameters of the core 105 of one or both of the lead-in fibers 102, 104. For example, the core 711 may have a substantially same refractive index, a substantially same outer core diameter, and a substantially same numerical aperture in order to minimize optical loss between lead-in fibers 102, 104 and the core 111 of the optical fuse device 101. In some embodiments, the outer diameter of the core 111 may be between about 6 μm and 20 μm, for example. The numerical aperture of the core 111 may be between about 0.1 and about 0.3, for example.

In some embodiments, an outer cladding 745 may be provided surrounding the preferentially-etchable portion 750. The outer cladding 745 may be relatively thin (about 3 μm to about 20 μm in radial thickness) or may be entirely omitted. Other values of radial thickness may be used. It may, however, be beneficial to have at least a thin layer of outer cladding 745 of substantially-pure silica on the outer portion of the structure-forming fiber 700 to simplify bonding (e.g., fusion splicing) of the lead-in fibers 102, 104 to the segment of structure-forming fiber 700.

Figure 6C:
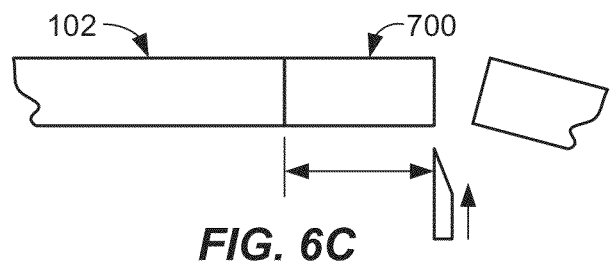
Figure 6D:
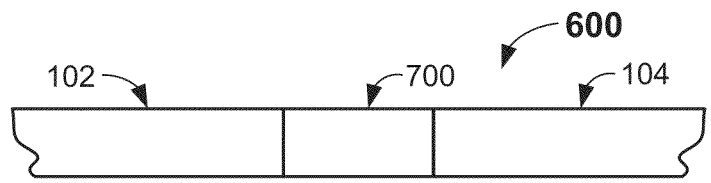
Figure 6E:
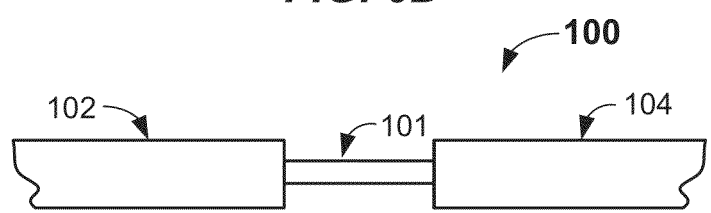

Again referring to FIGS. 5 and 6A-6E, the method 500 includes in 510, bonding (e.g., the substantially planar end) the structure-forming fiber 700 to the (e.g., substantially planar end) first lead-in fiber 102 as shown in FIG. 6B. In 512, the structure-forming fiber 700 is shortened to a predetermined length (as disclosed herein) that may correspond to a length of the optical fuse member (e.g., 101) as shown in FIG. 6C. The shortening may be accomplished by cleaving, cutting and polishing, or other suitable means (e.g., cleaving shown). The shortening may take place before or after the bonding step. A substantially planar end may optionally be formed on the shortened fiber in 513 to form substantially planar end surface that is substantially perpendicular to a longitudinal axis of the structure-forming fiber 700. In 514, a second lead-in fiber 104 is provided. A substantially planar end may optionally be formed on the second lead-in fiber 104 in 516 to form substantially planar end surface that is substantially perpendicular to a longitudinal axis of the lead-in fiber 104. In 518, the second lead-in fiber 104 is bonded (e.g., by fusion splicing) to the structure-forming fiber 700 on an end opposite from the first lead-in fiber 102 to form an in-line assembly 600 containing the first lead-in fiber 102, the structure-forming fiber 700, and the second lead-in fiber 104 as shown in FIG. 6D. In 520, the structure-forming fiber 700 of the assembly 600 is etched by exposure to a suitable etching medium to form the final shape of the optical fuse device (e.g., 101). For example, the etching (e.g., radial etching) may continue until a maximum outer diameter of the destructible region (e.g., 103) of the optical fuse device 101 is reduced to the predetermined outer diameter such as shown in FIG. 6E. In particular, the preferentially-etchable portion 750 of the structure-forming fiber 700 may be rapidly removed until the inner cladding-forming portion 713 is reached. Thus, a thin destructible region 103 of the optical fuse device (e.g., 101) is formed having an outer diameter that is substantially less than an outer diameter of the lead-in fibers 102, 104.

The etching step may be accomplished in a gaseous or liquid etching medium. The liquid medium may be hydrofluoric acid, buffered hydrofluoric acid, or other etching agents based on hydrofluoric acid. Other etching mediums may be used. Preferably the etching medium shall be stirred or agitated during etching to provide uniform etching of the optical fuse device (e.g., 101). Optionally, the etching medium may be a gas medium such as $SF_6$. A resultant optical fuse device (e.g., 101) after etching is shown in FIGS. 1A and 3C, for example.

The bonding between various fibers may be performed by fusion splicing, for example. Examples of fusion splicing may include arc fusion splicing, filament fusion splicing, and laser fusion splicing. Other suitable splicing or bonding methods may be used. Preferably, low loss methods should be employed. The end preparation of the substantially planar end surface of the fibers 102, 104, 700 and shortening may be performed by mechanical cleaving, laser cleaving, cutting, breaking, and/or polishing, or other methods.

The structure-forming fiber 700 may be formed using a convention optical fiber drawing methods. The performs (boules) from which the structure-forming fiber 700 is drawn may be formed by conventional inside or outside deposition methods, rod-in tube, stack and draw methods, or the like. Other preform-forming methods may be used.

As discussed above, the introduction of void elements, such as voids, holes, porosity, bubbles, macro-capillaries, micro-capillaries, or nano-capillaries may be provided in the structure-forming fiber 700. For example, such void elements may be provided in the preferentially-etchable portion 750. Introduction of the void elements may considerably increase an average etching rate of the portion including such void elements when exposed to the etching medium. In some embodiments, void elements such as macro-capillaries having diameters of between about 5 µm and about 20 µm may be introduced. Similarly, micro-capillaries having diameters of between about 0.5 and about 5 µm may be introduced. In other embodiments, nano-capillaries having diameters of between about 10 nm and about 0.5 µm may be introduced. The capillaries may be produced by stacking capillary tubes in the preform, preform drilling, porous layer formation, or other void-forming methods. The void structures may be the sole means for achieving a relatively higher etching rate of the preferentially-etchable portion 750. Optionally, the doping, as described above, of the preferentially-etchable portion 750 may be solely used, or in combination with the addition of such void structures to achieve the relatively higher etching rate.

As described above, the preferentially-etchable portion 750 of the structure-forming fiber 700 described herein may include micro-cracks. Illumination of afore-mentioned areas of the structure-forming fiber 700 with laser, particularly by using ultra short pulses, can cause formation of micro-cracks. When micro-cracks are present in the glass body they may increase the etching rate as described herein. For example, micro-crack formation is described in "Shape control of micro-channels fabricated in fused silica by femtosecond laser irradiation and chemical etching," Opt. Express, volume 17, 8685-8695 (2009) by Vishnubhatla et al., the disclosure of which is hereby incorporated by reference herein.

Figure 8:
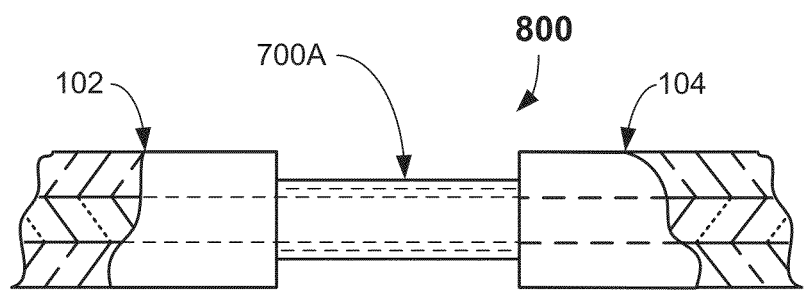
FIG. 8 illustrates a partially cross-sectioned side view of another embodiment of an optical fiber assembly including a relatively small diameter structure-forming fiber according to embodiments.

In another embodiment, as shown in FIG. 8, a variation of the embodiment of FIG. 1A-1B is disclosed. The structure-forming fiber 700A in this embodiment has smaller outside diameter than lead-in fibers 102, 104. Otherwise, the structure-forming fiber 700A includes core- and inner cladding-forming portions 711, 713 as previously described. The outer portion surrounding the inner cladding-forming portion 713 may include a dopant providing preferential etching; however, it is optional. While there is no exact physical limitation that would determine the minimum difference between the diameters of the lead-in fibers 102, 104 and the structure-forming fiber 700A, too large difference is not desired due to difficulty in fiber splicing, while too small difference results in thin and fragile spliced assembly. In some embodiments, the lead-in fibers 102, 104 may include an outside diameter of about 125 µm, and the structure-forming fiber 700A may have an outer diameter that is less than that (e.g., about 80 µm). Other smaller diameters than the lead-in fibers 102, 104 may be used.

In the case where no preferentially-etchable portion is provided, upon exposure to the etching medium, the lead-in fibers 102, 104 and the structure-forming fiber 700A may etch and about the same rate. When structure-forming fiber 700A is etched to a desired outer diameter (e.g., etching reaches the inner cladding-forming portion 713) the lead-in fibers 102, 104 will still have relatively large outer diameters in the regions where etching has taken place. Along the length of the lead-in fibers 102, 104, the diameter will naturally increase at locations away from the structure-forming fiber 700A, as these areas will be un-etched, and, thus, will be of the original outer diameter and thereby be suitable for handling and connection to an optical fiber line.

Figure 9A:
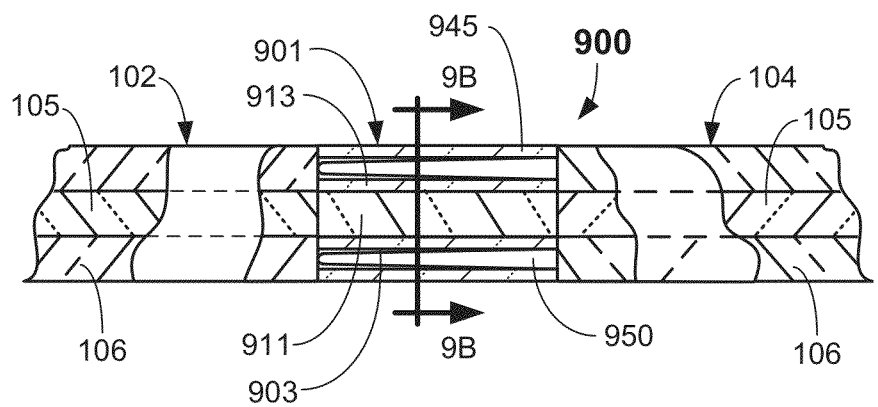
FIG. 9A illustrates a partially cross-sectioned side view of another embodiment of an optical fiber line including an optical fuse device according to embodiments.
Figure 9B:
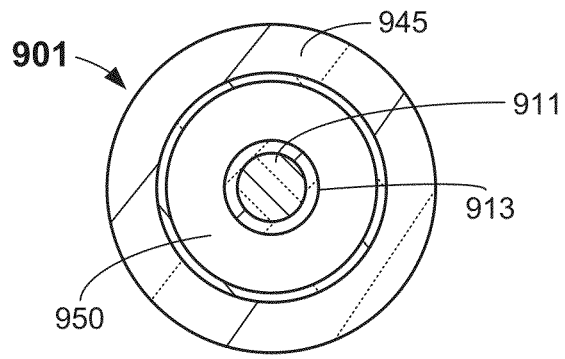
FIG. 9B illustrates an enlarged cross-sectioned end view of the embodiment of an optical fiber line including an optical fuse device of FIG. 9A taken along section line 9B-9B according to embodiments.

Another embodiment of a light intensity protected optical fiber line 900 including an optical fuse device 901 is shown in FIGS. 9A and 9B. The optical fuse device 901 includes a core 911 of an optically-transmissive material (e.g., doped silica), an inner cladding 913, and an outer cladding 945. The inner cladding 913 may be substantially pure silica and may be a thin annulus surrounding the core 911 of the dimensions described herein. The outer cladding 945 may be an annulus having a radial thickness of between about 2 µm and about 30 µm, for example. Other values of radial thickness may be used. The outer cladding 945 may be substantially pure silica.

Figure 10:
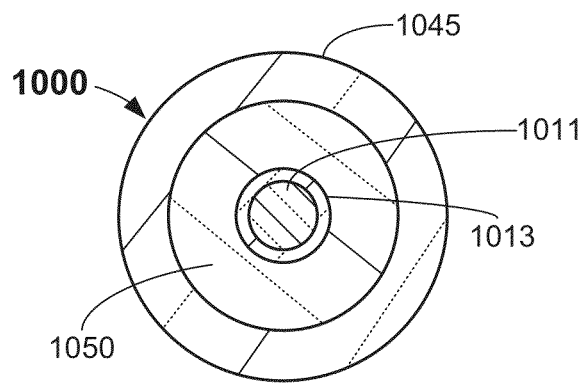
FIG. 10 illustrates an enlarged cross-sectioned end view of a structure-forming fiber that may be used to form an optical fuse device of FIG. 9A according to embodiments.
Figure 11:
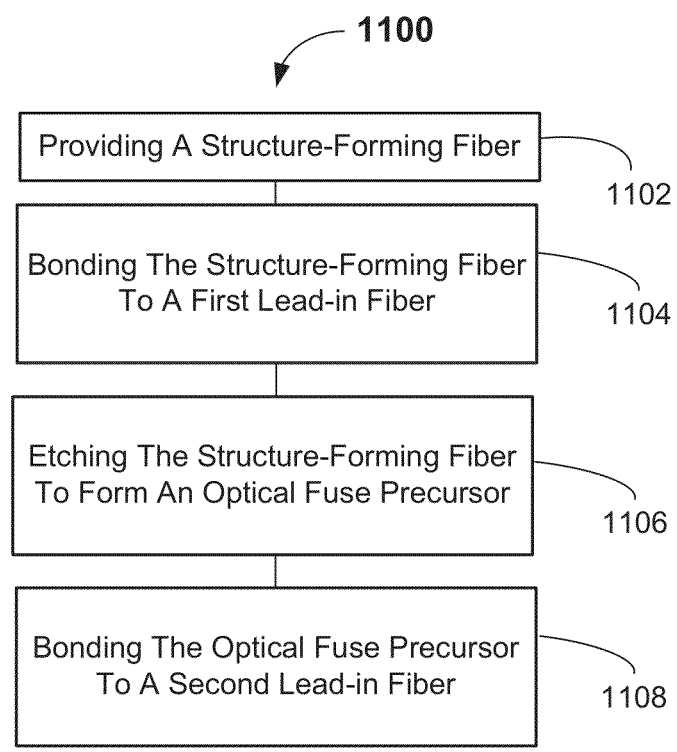
FIG. 11 illustrates a flowchart of another method according to embodiments.

FIG. 10 illustrates a suitable structure-forming fiber 1000 that may be used to form the optical fuse device 901 of FIGS. 9A and 9B. The optical fuse device 901 is bonded between respective lead-in fibers (e.g., 102, 104) to form a light intensity protected optical fiber line 900. The structure-forming fiber 1000 includes a core-forming portion 1011 and an inner cladding-forming portion 1013. The core-forming portion 1011 and inner cladding-forming portion 1013 may be of materials as herein described. Dopants that significantly increase refractive index, but have relatively little impact on the etching rate of silica may be utilized for doping of the core-forming portion 1011. Examples of such dopants are $Al_2O_3$ and $TiO_2$. Such dopants may be provided in amounts between about 0.02 mol % in silica to about 10 mol % in silica, for example. A preferentially-etchable portion 1050 may surround the core- and inner cladding-forming portions 1011, 1013. The preferentially-etchable portion 1050 may be manufactured from any fast etching material, such as $P_2O_5$-doped silica in the amounts described herein, silica including void structures or micro-cracking, or combinations of $P_2O_5$- doped silica and void structures, or combinations of $P_2O_5$-doped silica and micro-cracks, as described herein. An outer cladding-forming portion 1045 may be made of a slow etching material, such as substantially pure silica.

The embodiment of optical fuse device 901 shown in FIGS. 9A and 9B may be manufactured according to a method of manufacturing outlined below. The method 1100 of manufacturing an optical fuse device 901 is further described with reference to FIG. 11 and includes providing a structure-forming fiber 1000 in 1002 having a core-forming portion 1011, an inner cladding-forming portion 1013, a preferentially-etchable portion 1050, and an outer cladding-forming portion 1045. Each has a composition, size, and shape as described herein. The structure-forming fiber 1000 is then bonded in 1104, in an end-to-end configuration (e.g., via fusion splicing) to first lead-in fiber 102 to form a fiber assembly. Other bonding methods may be used. The structure-forming fiber 1000 may be bonded (e.g., spliced) to the lead-in fiber with a desired predetermined length already included, or the desired length may be provided after bonding via cleaving, cutting, breaking, and/or polishing, for example. Other suitable methods of cutting the fiber to form a substantially planar and perpendicular end thereon may be used. In 1106, at least the structure-forming fiber 1000 of the assembly is etched (e.g., axially etched) by exposure to an etching medium to remove at least a portion of the preferentially-etchable portion 1050 from a axial end of the structure-forming fiber 1000 to form an optical fuse device precursor coupled to the lead-in fiber 102 that has a core 911, an inner cladding 913, and an outer cladding 945, and a void 950 between the inner cladding 913 and outer cladding 945. In 1108, the optical fuse precursor is bonded to a second lead-in fiber 104 to form a light intensity protected optical fiber line (e.g., 900) including the optical fuse device 901. In particular, the outer cladding 945 is bonded to the cladding 106 of the second lead-in fiber 104 and the core 911 is bonded to the core 105 of the second lead-in fiber 104 as shown in FIG. 9A. Likewise, from the previous bonding step, the core 105 of the first lead-in fiber 102 is bonded to the core 911 and the outer cladding 945 is bonded to the cladding 106 of the first lead-in fiber 102.

Figure 12:
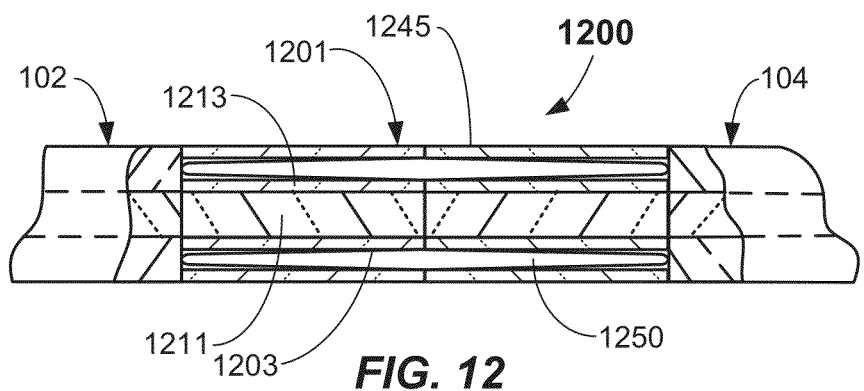
FIG. 12 illustrates a partially cross-sectioned side view of an optical fiber line including an optical fuse device according to embodiments.
Figure 13:
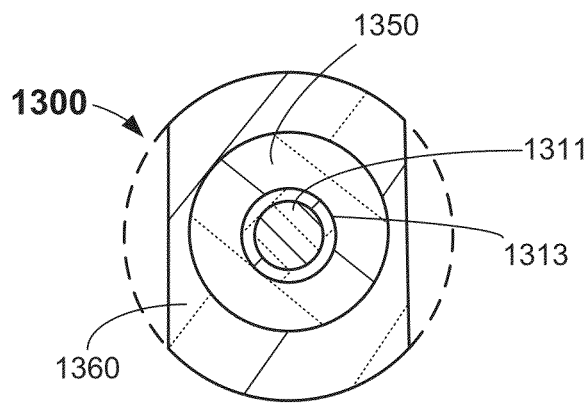
FIG. 13 illustrates a cross-sectioned end view of an optical fiber preform according to embodiments.

Optionally, as shown in FIG. 12, identical etched assemblies, formed via the previously discussed method, may be bonded together in an end-to-end configuration to form an optical fiber line 1200. The optical fiber line 1200 includes optical fuse device 1201 bonded between lead-in fibers 102, 104. The optical fuse device 1201 includes a core 1211, an inner cladding 1213, and an outer cladding 1245, and a void 1250 between the inner cladding 1213 and outer cladding 1245.

In the embodiments of FIGS. 9A, and 12 the preferred bonding method is fusion splicing. The fusion splicing may be accomplished using conventional optical fiber splicing equipment. Since the fusion splicing is accomplished at relatively high temperatures, typically above 2,000° K, the pressure P within the sealed space (e.g., 950) confined by the outer cladding 945, the inner cladding 913 and the ends of the lead-in fibers 102, 104, when equilibrated to room temperature after splicing, will be relatively low. An approximate expression for the pressure P is shown in Eqn. 1 below:

$$P = p_0 * T_s / T_r \qquad \text{Eqn. 1}$$

wherein $p_0$ is the pressure of the surrounding gas at beginning of the splicing process, $T_s$ is the absolute temperature at which splicing occurred, and $T_r$ is absolute room temperature.

Reduced pressure surrounding the thin destructible region (e.g., 903, 1203) of the optical fuse device (e.g., 901, 1201) may reduce the heat conduction and/or convection and thereby may decrease an optical power (intensity) required to destroy (e.g., melt or burn) the optical fuse device (e.g., 901, 1201) and thereby potentially shorten a fuse reaction time as described above. Thus, according to an aspect of the invention a sub-atmospheric pressure may be provided in the void (e.g., 950, 1250) surrounding the destructible region (e.g., 903, 1203).

Figure 14:
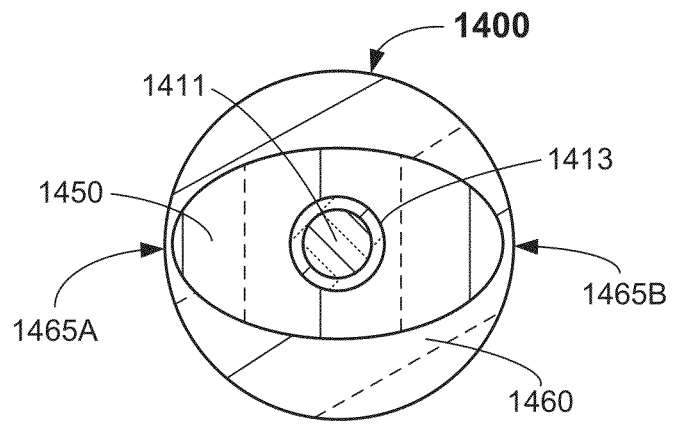
FIG. 14 illustrates an enlarged cross-sectioned end view of a structure-forming fiber that may be used to form an optical fuse device of FIGS. 15A-16 according to embodiments.
Figure 15A:
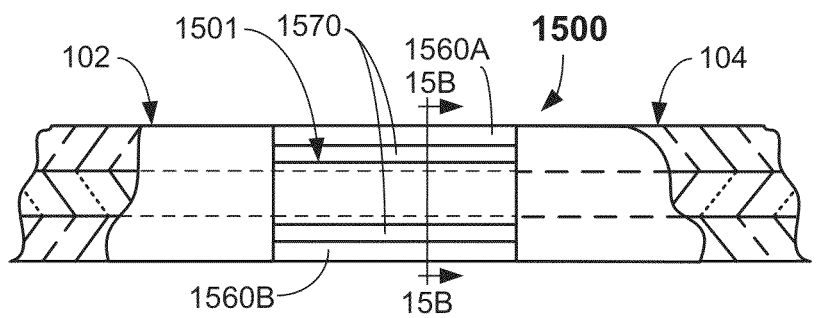
FIG. 15A illustrates a partially cross-sectioned side view of an optical fiber line including an optical fuse device according to another aspect of the invention.
Figure 15B:
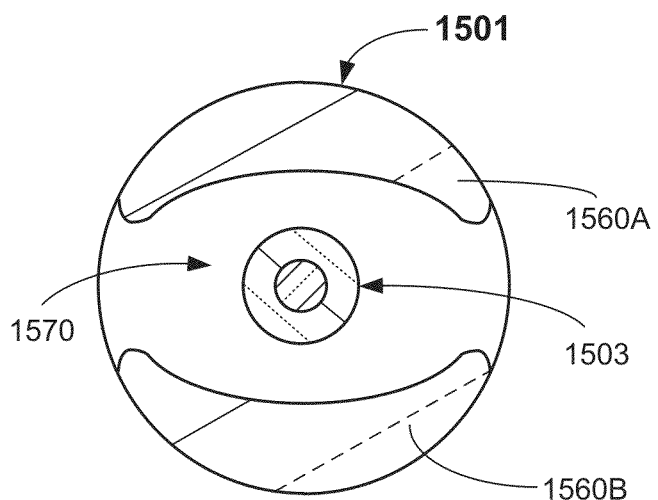
FIG. 15B illustrates an enlarged cross-sectioned end view of an optical fiber line including an optical fuse device of FIG. 15A taken along section line 15B-15B according to embodiments.

In another embodiment, as shown in FIGS. 15A and 15B, a variation of the embodiment of FIG. 8 is disclosed. The structure-forming fiber 1400, as shown in FIG. 14, in this embodiment has a diameter approximately equal to the outside diameter of the lead-in fibers 102, 104. Otherwise, the structure-forming fiber 1400 includes core- and inner cladding-forming portions 1411, 1413 as previously described. For example, the core 1411 may be silica doped with an effective amount of a suitable absorbing material. Metals such as Fe, V, Cr, Co may be doped in the core 111 as an absorbing material. The preferentially-etchable portion 1450 surrounding the inner cladding-forming portion 1413 may include a material providing a relatively high etching rate, such as $P_2O_5$-doped silica. In this embodiment, a structure-forming portion 1460 may be provided around the preferentially-etchable portion 1450. The structure-forming portion 1460 may be made of a material having a relatively low etching rate, such as substantially-pure silica.

The preform 1300 used to form the structure-forming fiber 1400 may include a core-forming portion 1311, inner cladding-forming portion 1313, preferentially-etchable portion 1350, and structure-forming portion 1360. The portions 1311, 1313, 1350, 1360 may be produced by rod-in tube, vapor deposition (inside or outside), or other conventional preform manufacturing techniques. Both sides (shown dotted) may be removed by cutting, grinding, sanding, abrading, combinations, or other suitable means. The preform 1300 is then drawn into the structure-forming fiber 1400 by conventional drawings techniques to produce a generally round structure-forming fiber 1400 having an elliptical or elongated preferentially-etchable portion 1450 and radially-opposed thin portions 1465A, 1465B as shown in FIG. 14. Of course, outer shapes other than round may be provided.

As previously discussed, a suitable length segment of the structure forming fiber 1400 is bonded between lead-in fibers 102, 104. Upon initial exposure to the etching medium, the lead-in fibers 102, 104 and the structure-forming fiber 1400 may etch and about the same rate. When the thin regions 1465A, 1465B of the structure-forming fiber 1400 are etched through, then the preferentially-etchable portion 1450 is rapidly removed until the etching progresses to the inner cladding-forming portion 1413. The material of the inner cladding-forming portion 1413 having a relatively low etching rate thus acts as a barrier to further etching. Likewise, the structure-forming portion 1460, because of its relatively low etching rate, remains largely of the same shape after etching. Accordingly, the support structures 1560A, 1560B and the destructible region 1503 of the optical fuse device 1501 are formed, and a void 1570 substantially surrounds the destructible region 1503, as best shown in FIG. 15B. The support structure comprising supports structures 1560A, 1560B extend alongside of the destructible region 1503. The support structures 1560A, 1560B may be of any suitable shape.

Figure 16:
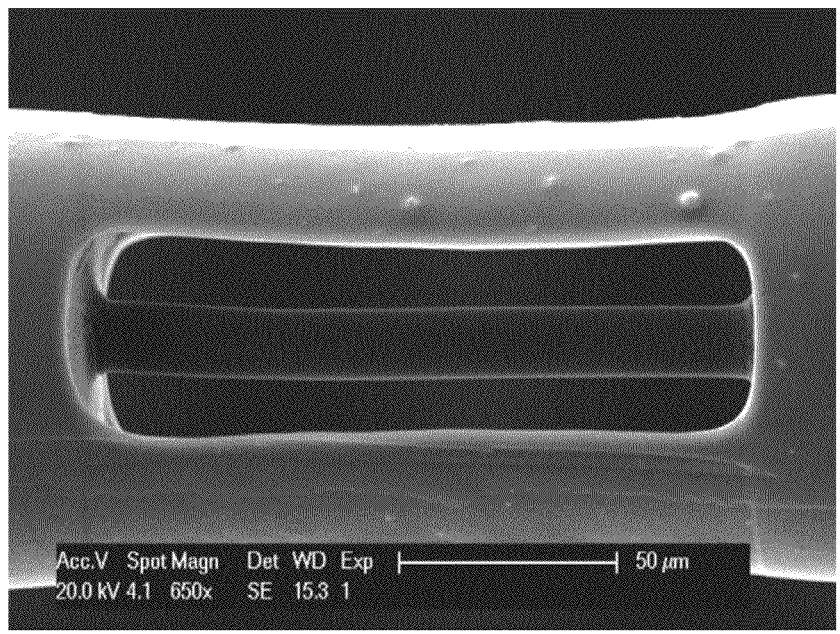
FIGS. 16-18 illustrate enlarged isometric micrographic views of several embodiments of manufactured optical fiber lines including optical fuse devices of various lengths according to embodiments.
Figure 17:
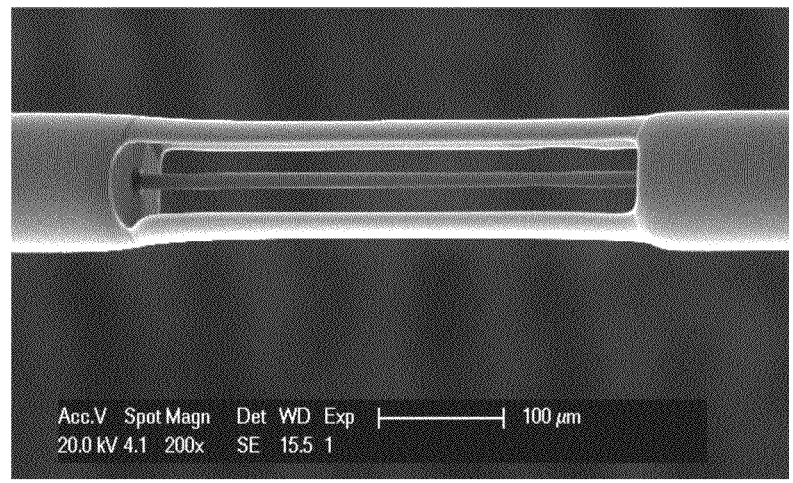
Figure 18:
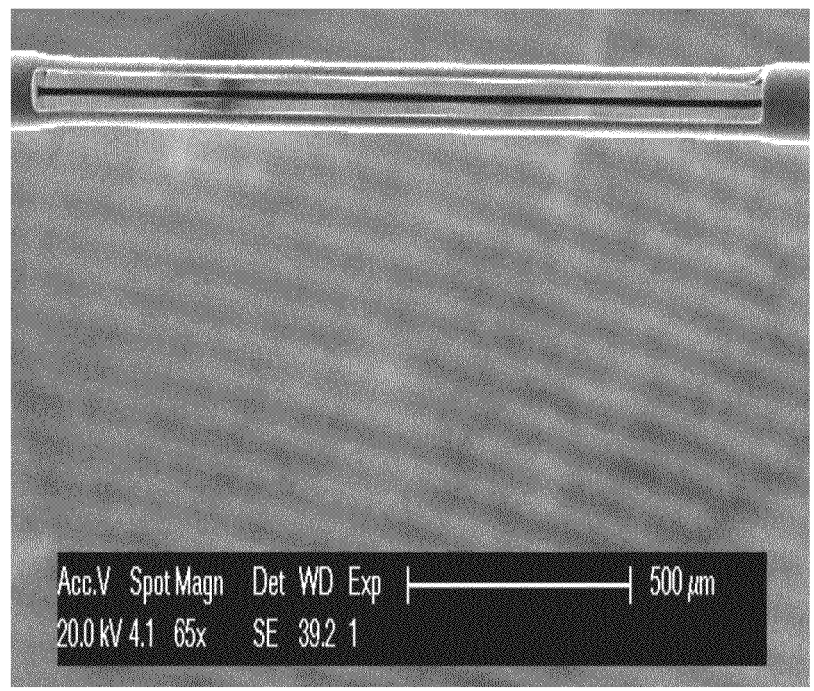

Several embodiments illustrating a structure that may be used for an optical fiber line including an optical fuse device are shown in the micrograph views of FIGS. 16-18. For example, fuse lengths between about 100 µm and 1500 µm may be used. An outer diameter of the optical fuse devices may be the same or slightly less than the diameter of the lead-in fibers. According to the method, optical fuse devices having any suitable length for the particular application they will be used in may be manufactured.

The foregoing description discloses only example embodiments of the invention. Modifications of the above-disclosed apparatus, systems, and methods which fall within the scope of the invention will be readily apparent to those of ordinary skill in the art. Accordingly, while the present invention has been disclosed in connection with example embodiments thereof, it should be understood that other embodiments may fall within the scope of the invention, as defined by the following claims.

The invention claimed is:

1. An optical fuse device, comprising:
a destructible region having a core, the destructible region including a light absorbing material adapted to heat the core, the destructible region adapted to be destroyed upon application of a light intensity greater than a predetermined threshold,
wherein the optical fuse device further includes an outer cladding and a void formed between the core and the outer cladding.

2. The optical fuse device of claim 1, wherein the core includes silica and the light absorbing material.

3. The optical fuse device of claim 2, wherein the light absorbing material comprises Fe, V, Cr, Co, or Ni.

4. The optical fuse device of claim 1, comprising an inner cladding surrounding the core.

5. The optical fuse device of claim 4, wherein the inner cladding has a thickness of less than 50% of a diameter of the core.

6. The optical fuse device of claim 1, wherein the light absorbing material is provided as a coating covering at least a portion of the outside surface of the destructible region.

7. The optical fuse device of claim 1, comprising a support structure extending alongside of the destructible region.

8. The optical fuse device of claim 1, wherein the core comprises at least two of $GeO_2$, $TiO_2$, $P_2O_5$, $AL_2O_3$, Fe, V, Cr, and Co, Ni and an inner cladding surrounding the core comprises substantially undoped silica.

9. The optical fuse device of claim 1, wherein a pyrotechnical or explosive material is applied to a surface of the destructible region.

10. The optical fuse device of claim 1, comprising a sub-atmospheric pressure in the void.

* * * * *